(12) United States Patent
Matsumura

(10) Patent No.: US 10,195,910 B2
(45) Date of Patent: Feb. 5, 2019

(54) TIRE

(71) Applicant: BRIDGESTONE CORPORATION, Tokyo (JP)

(72) Inventor: Hiroyuki Matsumura, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 590 days.

(21) Appl. No.: 14/768,496

(22) PCT Filed: Feb. 21, 2014

(86) PCT No.: PCT/JP2014/054123
§ 371 (c)(1),
(2) Date: Aug. 18, 2015

(87) PCT Pub. No.: WO2014/129572
PCT Pub. Date: Aug. 28, 2014

(65) Prior Publication Data
US 2016/0016440 A1    Jan. 21, 2016

(30) Foreign Application Priority Data
Feb. 22, 2013    (JP) ................. 2013-033446

(51) Int. Cl.
| | | |
|---|---|---|
| B60C 13/02 | (2006.01) | |
| B60C 15/024 | (2006.01) | |
| B60C 15/00 | (2006.01) | |

(52) U.S. Cl.
CPC .......... *B60C 13/02* (2013.01); *B60C 15/0009* (2013.01); *B60C 15/024* (2013.01); *B60C 2015/009* (2013.01)

(58) Field of Classification Search
CPC ... B60C 13/02; B60C 15/0009; B60C 15/024; B60C 2015/009
See application file for complete search history.

(56) References Cited

U.S. PATENT DOCUMENTS

| | | |
|---|---|---|
| 8,739,849 B2 | 6/2014 | Kuroishi |
| 9,266,398 B2 | 2/2016 | Yamaguchi |
| (Continued) | | |

FOREIGN PATENT DOCUMENTS

| | | |
|---|---|---|
| CN | 101605666 A | 12/2009 |
| CN | 101909908 A | 12/2010 |
| (Continued) | | |

OTHER PUBLICATIONS

Machine translation of JP06-032121 (no date).*
(Continued)

*Primary Examiner* — Justin R Fischer
*Assistant Examiner* — Philip N Schwartz
(74) *Attorney, Agent, or Firm* — Sughrue Mion, PLLC

(57) ABSTRACT

The carcass of this tire (1) has a carcass body and folded sections each folded around a bead core. A circumferential recessed section, which is recessed inward in the tire width direction and extends in the tire circumferential direction, is formed on the outer surface of the tire side section, and turbulence-generating protrusions are provided on the circumferential recessed section. In a cross-section of the tire, wherein the distance between the inner surface of the carcass body section and a rim-separation point where the inner surface comes into contact with a normal rim is defined as a tire reference thickness, and the distance between the inner surface of the folded section and the tire outer surface at the circumferential recessed section is defined as a tire thickness, the multiple turbulence-generating protrusions are provided in an area where the tire thickness is between 20% and 60% of the tire reference thickness.

20 Claims, 5 Drawing Sheets

(56) References Cited

U.S. PATENT DOCUMENTS

| | | |
|---|---|---|
| 2010/0180994 A1 | 7/2010 | Yamaguchi |
| 2010/0294412 A1 | 11/2010 | Inoue et al. |
| 2011/0041971 A1 | 2/2011 | Kuroishi |
| 2012/0097305 A1 | 4/2012 | Kuroishi et al. |
| 2013/0168002 A1* | 7/2013 | Mishima ................ B60C 13/02 152/523 |
| 2013/0292025 A1 | 11/2013 | Kuroishi et al. |

FOREIGN PATENT DOCUMENTS

| | | | | |
|---|---|---|---|---|
| CN | 102458885 A | | 5/2012 | |
| JP | 62-1605 A | | 1/1987 | |
| JP | 06032121 A | * | 2/1994 | ............ B60C 15/00 |
| JP | 2009-83769 A | | 4/2009 | |
| JP | 2012-30557 A | | 2/2012 | |
| JP | 2012-40769 A | | 3/2012 | |
| WO | 2009/084634 A1 | | 7/2009 | |
| WO | 2012/018128 A1 | | 2/2012 | |

OTHER PUBLICATIONS

Communication dated Sep. 29, 2015 from the Japanese Patent Office in counterpart application No. 2013-033446.
Communication dated Jan. 27, 2016 from the European Patent Office in counterpart application No. 14754214.6.
Japanese Office Action for JP 2013-033446 dated Mar. 31, 2015.
International Search Report for PCT/JP2014/054123 dated May 27, 2014.

* cited by examiner

TIRE

CROSS REFERENCE TO RELATED APPLICATIONS

This application is a National Stage of International Application No. PCT/JP2014/054123 filed Feb. 21, 2014, claiming priority based on Japanese Patent Application No. 2013-033446, filed Feb. 22, 2013, the contents of all of which are incorporated herein by reference in their entirety.

TECHNICAL FIELD

The present invention relates to a tire having a tread section in contact with a road surface, a tire side section continuous to the tread section, and a bead section continuous to the tire side section.

BACKGROUND ART

In the prior art, in a tire for heavy load such as an off-the-road-radial (ORR) tire and a truck and bus radial (TBR) tire, rubber on a tire side section, in particular, rubber on a bead section side is apt to be deformed by friction with a rim flange and thrusting up from the rim flange. In order to reduce such deformation, a method of increasing thickness of the rubber on the tire side section, in particular, the rubber on the bead section side is employed. However, if the thickness of rubber is increased, heat is likely to be generated by the deformation of the rubber. The heat generation in the tire side section promotes degradation of the rubber, leading to deterioration of durability of a tire, and therefore, a tire which reduces a temperature increase in the tire side section has been desired.

In order to solve such a problem, there has been proposed a method of providing a turbulence-generating protrusion, which projects outward in a tire width direction from an outer surface of the tire side section, in a portion of the tire side section to generate turbulence of air on the outer surface of the tire side section, and, thus, to reduce the temperature increase (for example, see Patent Literature 1).

In tires for heavy load, since thickness of rubber in a tire side section is larger than thickness of a tire for passenger car, although the provision of the turbulence-generating protrusion gives a cooling effect on an outer surface of the tire side section, an inside of the tire cannot be cooled, so that the effect of reducing the temperature increase may not be obtained 14 sufficiently.

Thus, in recent years, there has been considered that a circumferential recessed section depressed inward in a tire width direction is formed in a portion of a tire side section along a tire circumferential direction, and, at the same time, a turbulence-generating protrusion is provided in a region where the circumferential recessed section is formed, whereby the temperature increase is more efficiently reduced.

CITATION LIST

Patent Literature

Patent Literature 1: WO 2009/084634 A

SUMMARY OF INVENTION

Technical Problem

However, the thickness of rubber in the region where the circumferential recessed section is formed is smaller than that in the other regions. When the turbulence-generating protrusion is formed in a region where the thickness of rubber is small, a carcass section provided in a tire may be deformed during manufacturing of the tire. Specifically, a carcass cord constituting the carcass section may sometimes project and be recessed in a tire width direction due to flowing of rubber upon the formation of the turbulence-generating protrusion. There is a problem that such deformation of the carcass section causes deterioration of tire durability.

Namely, although the provision of the turbulence-generating protrusion in the region where the circumferential recessed section is formed can efficiently reduce the temperature increase, the tire durability is apt to be deteriorated, and therefore, measures are thus required.

Thus, an object of the present invention is to provide a tire which simultaneously achieves reduction of a temperature increase in a tire side section and improvement of tire durability.

As a result of intensive studies made by the present inventors in terms of simultaneous achievement of reduction of a temperature increase in a tire side section and improvement of tire durability, the inventors found that if a tire thickness is within a predetermined range, the effect of reducing the temperature increase can be increased, and an influence on deformation of a carcass section can be reduced during manufacturing of a tire.

A feature of the present invention is summarized as a tire (pneumatic tire 1) including a tread section (tread section 10) in contact with a road surface, a tire side section (tire side section 20) continuous to the tread section, a bead section (bead section 30) continuous to the tire side section, and a carcass section (carcass section 40) extending throughout the tread section, the tire side section, and the bead section, wherein the carcass section has a carcass body section (carcass body section 41) provided ranging from the tread section to a bead core in the bead section through the tire side section and a folded section (folded section 42) folded at the bead core, the tire side section includes a circumferential recessed section (circumferential recessed section 100) recessed inward in a tire width direction and extending in a tire circumferential direction, the circumferential recessed section is provided with a plurality of turbulence-generating protrusions (turbulence-generating protrusion 110) projecting outward in the tire width direction, and in a tire cross section along the tire width direction and a tire radius direction, when a distance between an inner surface on the inside in the tire width direction of the carcass body section and a rim-separation point in contact with a standard rim is specified as a tire reference thickness (tire reference thickness T0), and when a distance between an inner surface on the inside in the tire width direction of the folded section and a tire outer surface of the circumferential recessed section is specified as a tire thickness (tire thickness T1), the plurality of turbulence-generating protrusions are provided in a region where the tire thickness is 20% or more and 60% or less of the tire reference thickness.

DESCRIPTION OF EMBODIMENTS

Figure 1:
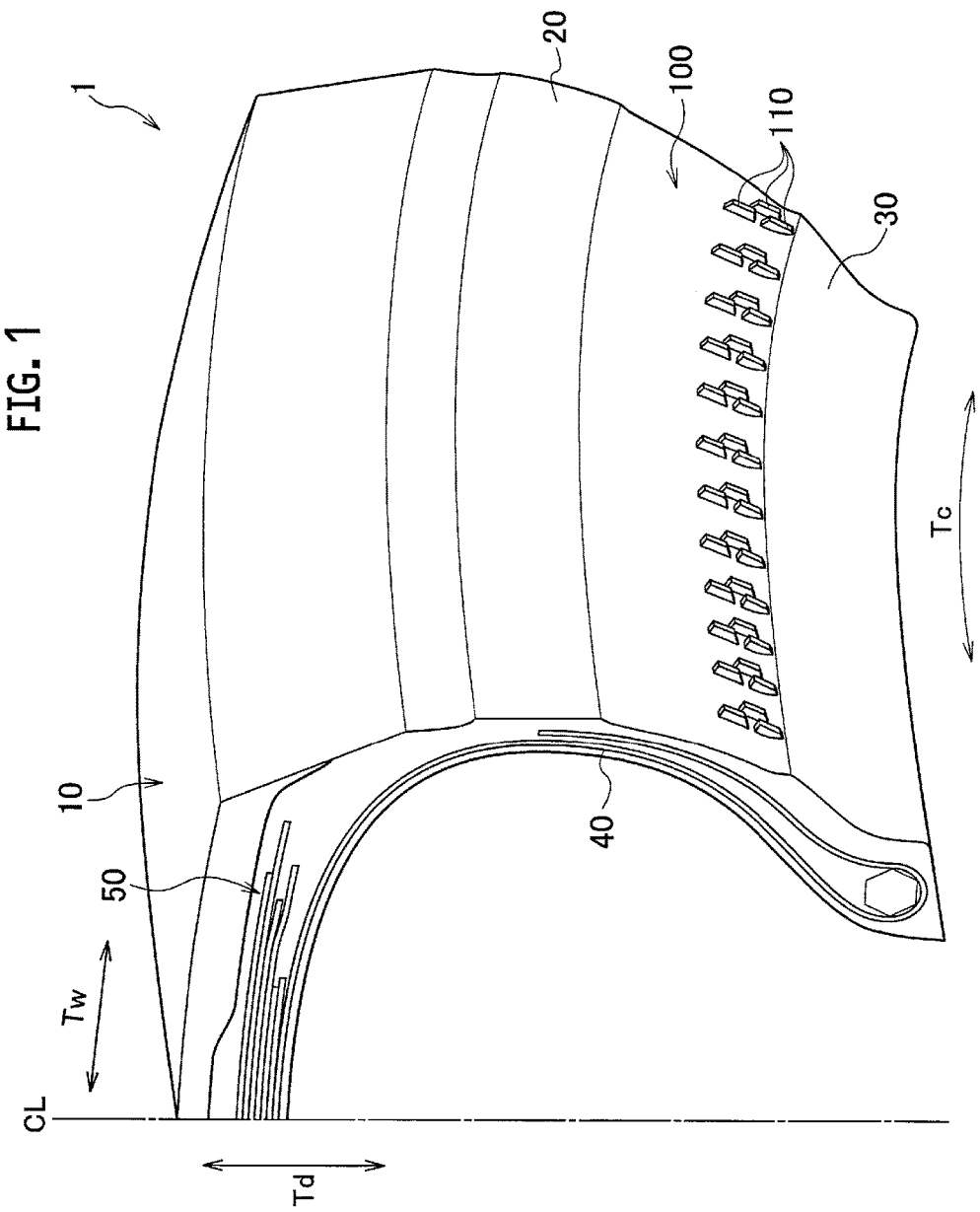
FIG. 1 is a partially exploded perspective view of a pneumatic tire 1 according to a first embodiment of the present invention.

Next, embodiments according to the present invention will be described with reference to the drawings. Note that, in the following description of the drawings, the same or similar parts will be denoted by the same or similar reference numerals. However, it should be noted that the drawings are conceptual and ratios of respective dimensions and the like are different from actual ones. Therefore, specific dimensions and the like should be determined by taking into consideration the following description. Moreover, also among the drawings, there are included portions in which dimensional relationships and ratios are different from each other.

First Embodiment

First, a first embodiment of the present invention is described.

(1) Configuration of Pneumatic Tire 1

Figure 2:
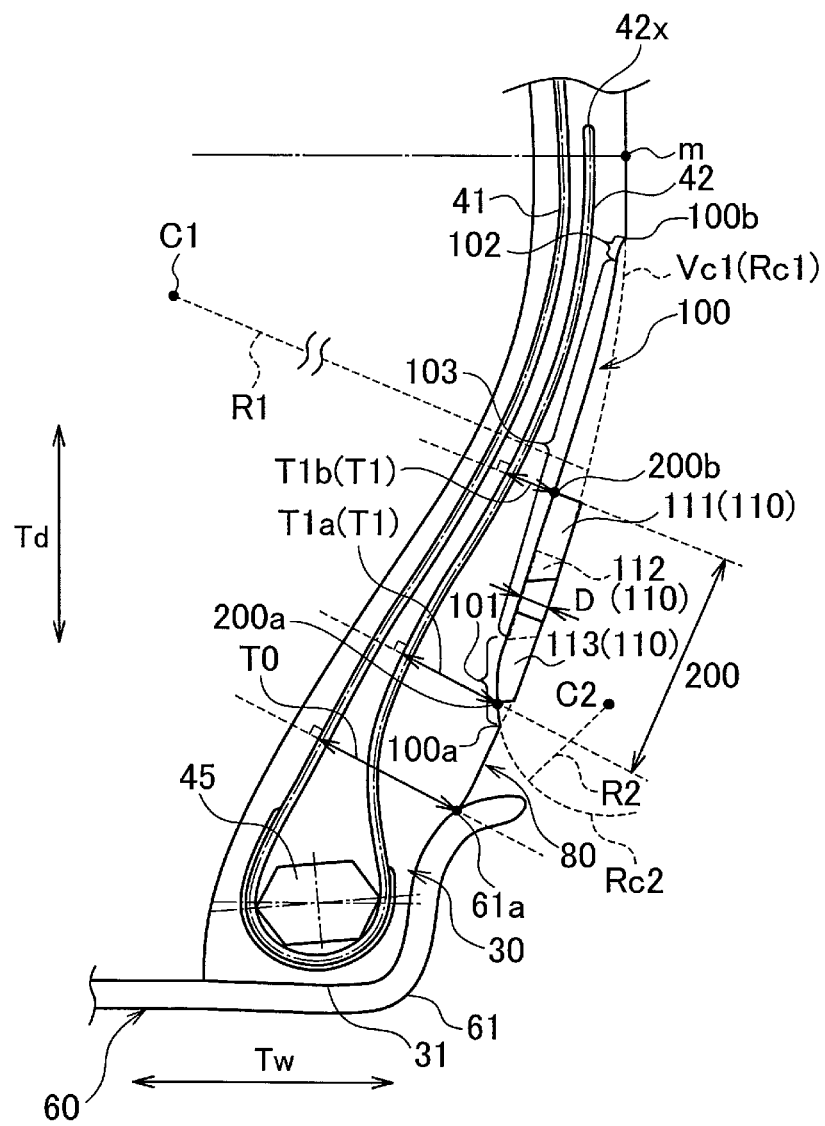
FIG. 2 is a cross-sectional view showing the pneumatic tire 1 according to the first embodiment of the invention.
Figure 3A:
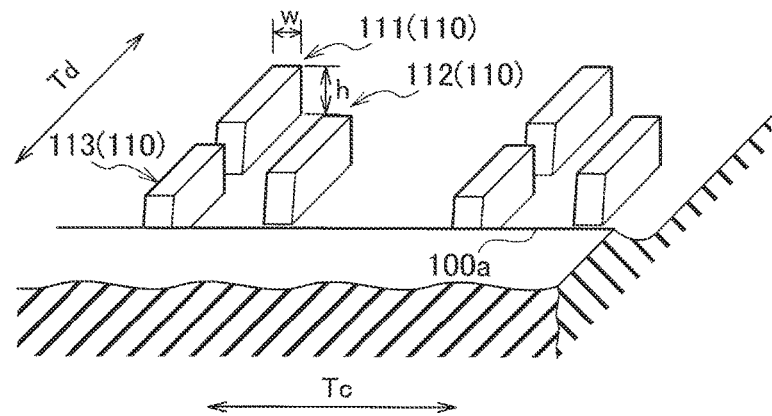
FIG. 3(a) is a partially enlarged perspective view of the pneumatic tire 1 according to the first embodiment of the invention.
Figure 3B:
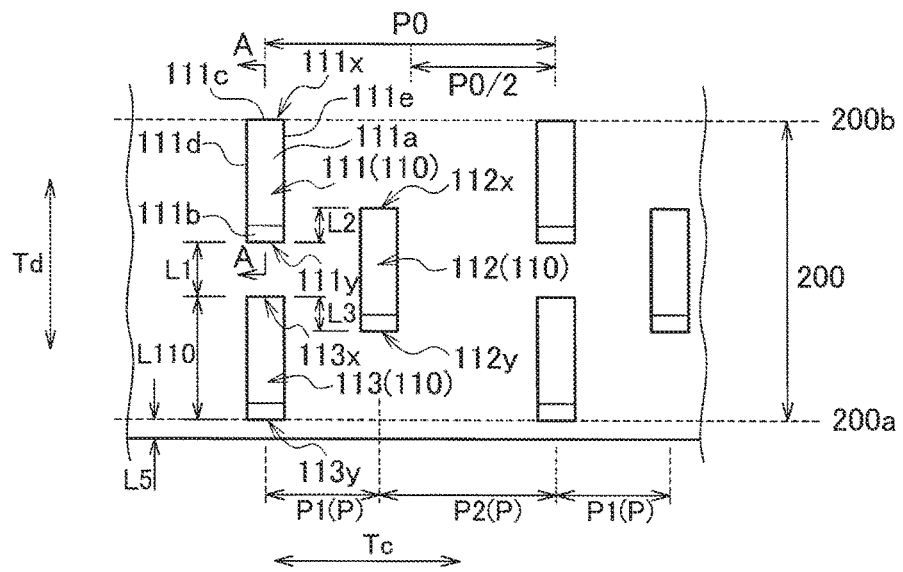
FIG. 3(b) is a partially enlarged side view of the pneumatic tire 1 according to the first embodiment of the invention.
Figure 3C:
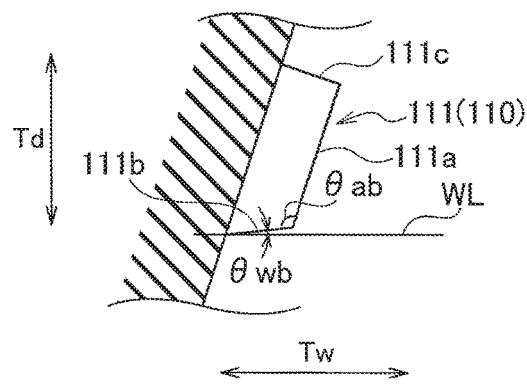
FIG. 3(c) is a cross-sectional view along a line A-A shown in FIG. 3(b).
Figure 4:
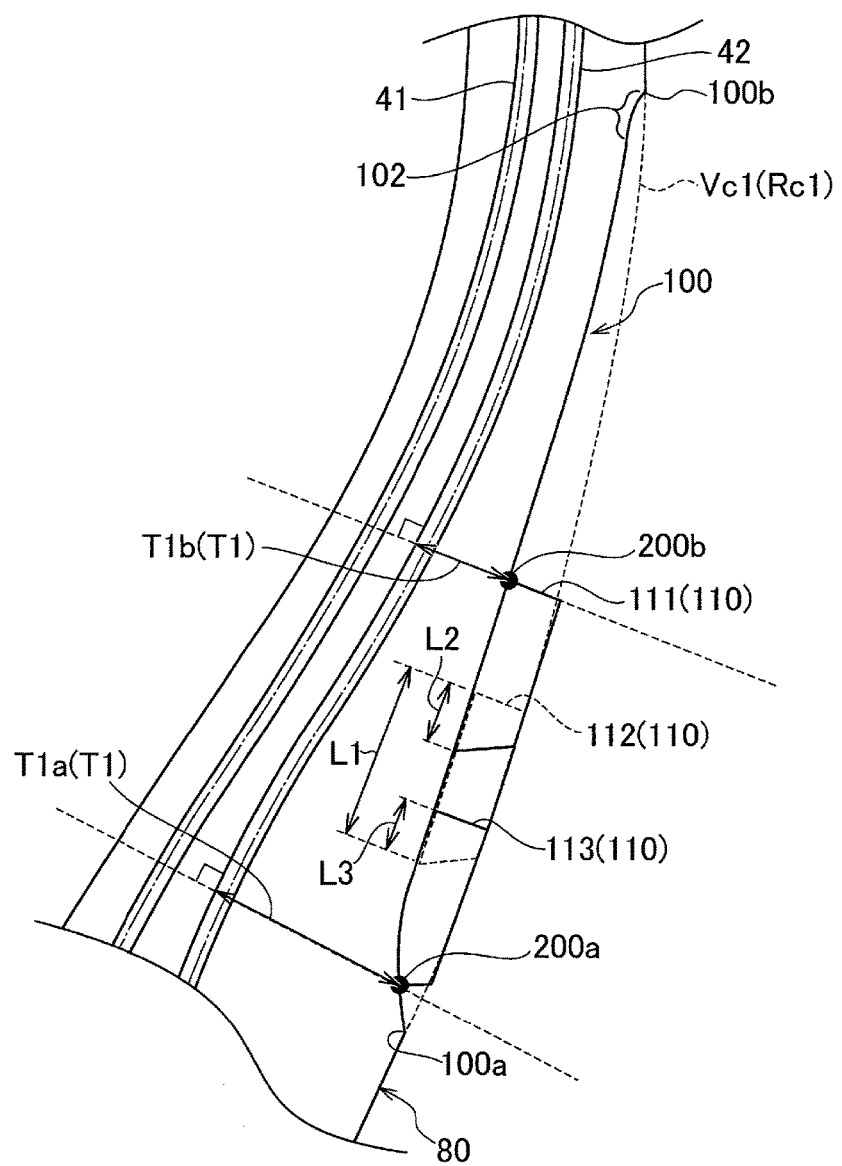
FIG. 4 is an enlarged view of a circumferential recessed section of the cross-sectional view shown in FIG. 2.

A pneumatic tire 1 according to the present embodiment is a pneumatic tire for heavy load (a tire for heavy load) mounted on a construction vehicle such as a dump truck. The configuration of the pneumatic tire 1 will be described with reference to the drawings. FIG. 1 is a partially exploded perspective view showing the pneumatic tire 1 according to this embodiment. FIG. 2 is a partially cross-sectional view showing the pneumatic tire 1 according to this embodiment. FIG. 3 is a partially enlarged cross-sectional view of the pneumatic tire 1 according to this embodiment. FIG. 4 is an enlarged view of a circumferential recessed section shown in FIG. 2.

As shown in FIG. 1, the pneumatic tire 1 has a tread section 10 grounded on a road surface during running of the tire, a tire side section 20 continuous to the tread section 10, and a bead section 30 continuous to the tire side section 20.

The tire side section 20 has on its outer surface a circumferential recessed section 100 depressed inward in a tire width direction Tw and extending in a tire circumferential direction TC. The pneumatic tire 1 has a carcass section 40 constituting a framework of the pneumatic tire 1 and a belt layer 50 provided outside in a tire radius direction Td of the carcass section 40 in the tread section 10.

The carcass section 40 is constituted of a carcass cord and a layer formed from rubber covering the carcass cord. The carcass section 40 extends throughout the tread section 10, the tire side section 20, and the bead section 30. The carcass section 40 has a body section 41, which provided ranging from the tread section 10 to a bead core 45 in the bead section 30 via the tire side section 20, and a folded section 42 folded at the bead core 45.

In a tire cross section along the tire width direction and the tire radius direction Td in a no-load state with a normal internal pressure and no load applied, an end 42x on the outside in the tire radius direction Td of the folded section 42 is provided outward in the tire radius direction Td from the bead end 31 located on the innermost side in the tire radius direction Td and is located in a range of 40% or more and 60% or less of a tire height H. In this embodiment, the tire height H is a length in the tire radius direction Td from the bead end 31, located at a lower end on the inside in the tire radius direction Td, to a tread surface of the tread section 10 grounded on a road surface in such a state that the pneumatic tire 1 is assembled on a rim wheel 60.

The belt layer 50 is formed by impregnating a steel cord with a rubber component. Also, the belt layer 50 includes multiple layers, which are laminated in the tire radial direction Td. The bead section 30 is provided along the tire circumferential direction Tc, and is disposed on either side of a tire equator line CL in the tread width direction Tw. Note that since the pneumatic tire 1 has a line-symmetric structure with respect to the tire equator line CL, FIG. 1 show only one side thereof.

In this embodiment, in the state in which the pneumatic tire 1 is assembled on the rim wheel 60, a point on the outermost side in the tire radius direction Td at which the pneumatic tire 1 is in contact with a rim flange 61 of the rim wheel 60 is specified as a rim-separation point 61a. The state in which the pneumatic tire 1 is assembled on the rim wheel 60 means a state in which the pneumatic tire 1 is assembled on a standard rim (normal rim) specified in a standard with a pneumatic pressure corresponding to a maximum load specified in the standard. This state may also refer to a state in which the pneumatic tire 1 in a no-load state with a normal internal pressure and no load applied is assembled on the rim wheel 60.

Here, the standard is JATMA YEAR BOOK (2010 edition, Japan Automobile Tyre Manufacturers Association standards). It should be noted that in cases where TRA standards or ETRTO standards are applied to a location of use or manufacturing location, accordance is made to the respective standards. In this embodiment, a boundary between the tread section 10 and the tire side section 20 is a tread end TE, and a boundary between the tire side section 20 and the bead section 30 is the rim-separation point 61a.

In this embodiment, an outer surface of the tire side section 20 has a rim-side outer surface 80 in a range from the rim-separation point 61a to an inner end 100a in the tire radius direction Td of the circumferential recessed section 100 in a tire cross section along the tread width direction Tw and the tire radius direction Td of the pneumatic tire 1.

As shown in FIG. 2, the rim-side outer surface 80 is provided along a predetermined circular arc curve Rc1 having a center C1 of a curvature radius R1 on the inside in the tread width direction Tw. Namely, the rim-side outer surface 80 is formed into a curved shape bulging outward in the tread width direction Tw. The rim-side outer surface 80 is thus formed to secure a certain degree of rigidity in a region on the bead section 30 side of the tire side section 20.

It is preferable that the center C1 of the curvature radius R1 is located on a virtual straight line extending in the tread width direction Tw from a tire maximum width portion m. In other words, the inner end 100a in the tire radius direction Td of the circumferential recessed section 100 is a boundary between a tire outer surface of the circumferential recessed section 100 and a tire outer surface (rim-side outer surface 80) formed into a curved shape in the tire cross section.

(2) Configuration of Circumferential Recessed Section

Next, a configuration of the circumferential recessed section 100 is concretely described. The circumferential recessed section 100 is formed in an area from the position of the tire maximum width portion m to the rim-separation point 61a. Note that it is preferable that a length of the circumferential recessed section 100 in the tire radial direction Td and a depth thereof in the tread width direction Tw are appropriately determined based on the size of the pneumatic tire 1 and the type of a vehicle equipped therewith.

Also, the circumferential recessed section 100 includes: an inner wall surface 101 positioned on the inside of the circumferential recessed section 100 in the tire radial direction Td; an outer wall surface 102 positioned on the outside of the circumferential recessed section 100 in the tire radial direction Td; and a bottom surface 103 positioned between the inner wall surface 101 and the outer wall surface 102. Note that the circumferential recessed section 100 can be divided into three regions, in the tire radial direction Td, where the inner wall surface 101 is formed, where the outer wall surface 102 is formed, and where the bottom surface 103 is formed.

The inner wall surface 101 extending from the inner end 100a in the tire radius direction Td of the circumferential recessed section 100 to a deepest portion of the circumferential recessed section 100 is provided along a circular arc curve Rc2 having a center C2 of a curvature radius R2 on the outside in the tire width direction Tw. Namely, the circumferential recessed section 100 is formed to be depressed from the inner end 100a in the tire radius direction Td to the deepest portion by a curved shape.

The curvature radius of the bottom surface is more than the curvature radius of the inner wall surface 101 and less than the curvature radius of the outer wall surface 102. The curvature radius of a circular arc curve changes at a boundary between the inner wall surface 101 and the bottom surface and a boundary between the outer wall surface 102 and the bottom surface.

According to the pneumatic tire 1, the rotation of the tire allows air flowing along the tire side section 20 to be smoothly flown into the circumferential recessed section 100 along the side wall surface 101 having a curved shape and allows air in the circumferential recessed section 100 to be easily discharged outside. Namely, an amount of air circulating inside the circumferential recessed section 100 is increased, thus reducing a temperature increase of rubber.

It is preferable that the curvature radius R2 of a circular arc curve formed by the inner wall surface 101 in a cross section along the tire width direction Tw and the tire radius direction Td of the pneumatic tire 1 is 50 mm or more in a no-load state. This is because if the curvature radius R2 of the inner wall surface 101 is less than 50 mm, distortion of the inner wall surface 101 occurring due to falling-down of the tire side section 20 when load is applied concentrates locally, so that crack resistance on the bead section 30 side of the tire side section 20 may be deteriorated. In the pneumatic tire 1, a curvature radius Ra of the inner wall surface 101 in the no-load state with a normal internal pressure and no load applied and a curvature radius Rb of the inner wall surface 101 in a normal load state with a normal internal pressure and normal load applied may satisfy a relationship of $(Ra-Rb)/Ra \leq 0.5$.

Similarly, the outer wall surface 102 may be provided along a circular arc curve having a center of a radius curvature on the outside in the tire width direction Tw. Namely, the circumferential recessed section 100 may be formed to be depressed from an outer end 100b in the tire radius direction Td to the deepest portion by a curved shape.

As shown in FIG. 2, in this embodiment, in the tire cross section in the no-load state, a virtual circular arc curve Vc1 obtained by extending the predetermined circular arc curve Rc1 along the rim-side outer surface 80 to a region where the circumferential recessed section 100 is formed is specified. Further, in this embodiment, if the virtual circular arc curve Vc1 obtained by extending the predetermined circular arc curve Rc1 is specified, a maximum depth D of the circumferential recessed section 100 with respect to the virtual circular arc curve Vc1 is in a range of 15 mm or more and 35 mm or less. In an example of FIG. 2, the virtual circular arc curve Vc1 is shown by a dotted line. The maximum depth D is an interval from a bottom surface of the circumferential recessed section 100 to the virtual circular arc curve Vc1, as shown in FIG. 2. Specifically, when a line orthogonal to a tire surface (bottom surface) of the circumferential recessed section 100 is specified based on the virtual circular arc curve Vc1, the depth of the circumferential recessed section 100 based on the virtual circular arc curve Vc1 is a distance from a point at which the orthogonal line crosses a tire outer surface of the circumferential recessed section 100 to a point at which the orthogonal line crosses the virtual circular arc curve Vc1.

In this embodiment, the inner end 100a in the tire radius direction Td of the circumferential recessed section 100 is provided from the rim-separation point 61a to the outside in the tire radius direction Td at a position within a predetermined range. Specifically, the end 100a in the standard load state in which a standard internal pressure is filled in the pneumatic tire 1, and standard load is applied to the pneumatic tire 1 is located from the rim-separation point 61a to the outside in the tire radius direction Td in a range of 0% or more and 25% or less of a tire height H as a tire height H in the tire radius direction Td in the no-load state with a normal internal pressure and no load applied. In this embodiment, the tire height H is, as shown in FIG. 2, a length in the tire radius direction Td from the bead end 31 on the inside in the tire radius direction Td to the tread surface of the tread section 10 in such a state that the pneumatic tire 1 is assembled on the rim wheel 60. The bead end 31 is a lower end located on the innermost side in the tire radius direction Td of the pneumatic tire 1 assembled on the rim wheel 60.

The circumferential recessed section 100 according to this embodiment includes a plurality of turbulence-generating protrusion 110 projecting outward in the tire width direction Tw. The turbulence-generating protrusion 110 has a block shape. The detailed configuration of the turbulence-generating protrusion 110 will be described later.

(3) Configuration of Turbulence-Generating Protrusion

Next, the configuration of the turbulence-generating protrusion 110 of the circumferential recessed section 100 will be described with reference to the drawings. Here, FIG. 3(a) shows a partially enlarged perspective view of the circumferential recessed section 100 according to this embodiment. FIG. 3(b) shows a partially enlarged plan view of the circumferential recessed section 100 according to a first embodiment. FIG. 3(c) shows a cross-sectional view along a line A-A shown in FIG. 3(b).

In this embodiment, the turbulence-generating protrusion 110 protruding outward in the tread width direction Tw is formed on the inside of the circumferential recessed section 100. Note that the inside of the circumferential recessed section 100 means an inside of a region between the inner end 100a of the circumferential recessed section 100 in the tire radial direction Td and the outer end 100b of the circumferential recessed section 100 in the tire radial direction Td.

Specifically, a plurality of the turbulence-generating protrusion 110 include a first turbulence-generating protrusion 111 and a second turbulence-generating protrusion 112 arranged with a predetermined pitch in the tire circumferential direction Tc from the first turbulence-generating protrusion 111. Both ends 111x and 111y in the tire radius direction Td of the first turbulence-generating protrusion 111 and both ends 112x and 112y in the tire radius direction of the second turbulence-generating protrusion 112 are arranged so that the positions in the tire radius direction are different from each other. According to the pneumatic tire 1, when air flows inside the circumferential recessed section 100, since air which has not collided with the first turbulence-generating protrusion 111 collides with the second turbulence-generating protrusion 112 adjacent to the first turbulence-generating protrusion 111 in the tire circumferential direction Tc, turbulence is more easily generated.

In this embodiment, the turbulence-generating protrusion 110 includes the first turbulence-generating protrusion 111, the second turbulence-generating protrusion 112, and a third turbulence-generating protrusion 113 arranged with an interval on the inside in the tire radius direction Td of the first turbulence-generating protrusion 111.

The end 112x on the outside in the tire radius direction Td of the second turbulence-generating protrusion 112 may be located on the outer side in the tire radius direction Td than the end 111y on the inside in the tire radius direction Td of the first turbulence-generating protrusion 111. Specifically, as shown in FIG. 3(b), the end 112x on the outside in the tire radius direction Td of the second turbulence-generating protrusion 112 may be away from the end 111y on the inside in the tire radius direction Td of the first turbulence-generating protrusion 111 by a distance L2 on the outside in the tire radius direction Td.

The end 112y on the inside in the tire radius direction Td of the second turbulence-generating protrusion 112 may be located on the inner side in the tire radius direction Td than an end 113x on the outside in the tire radius direction Td of the third turbulence-generating protrusion 113. Specifically, as shown in FIG. 3(b), the end 112y on the inside in the tire radius direction Td of the second turbulence-generating protrusion 112 may be away from the end 113x on the outside in the tire radius direction Td of the third turbulence-generating protrusion 113 by a distance L3 on the inside in the tire radius direction Td.

The distance L1 is longer than the distances L2 and L3. The distances L2 and L3 are equal to or more than the width w which is a tire circumferential direction length of the turbulence-generating protrusion. This constitution increases the entire radial length of the first protrusion to the third protrusion to increase an amount of air having collided with the protrusion and separated from or adhered to a tire surface, and, thus, to enhance a cooling effect.

According to the pneumatic tire 1, since an airflow passing through between the first turbulence-generating protrusion 111 and the third turbulence-generating protrusion 113 collides with the second turbulence-generating protrusion 112 adjacent to them in the tire circumferential direction Tc, turbulence is more easily generated.

Hereinafter, the first turbulence-generating protrusion 111, the second turbulence-generating protrusion 112, and the third turbulence-generating protrusion 113 are suitably shown as the turbulence-generating protrusion 110.

In this embodiment, although the turbulence-generating protrusion 110 include three kinds of the turbulence-generating protrusions such as the first turbulence-generating protrusion 111, the second turbulence-generating protrusion 112, and the third turbulence-generating protrusion 113, one (for example, the first turbulence-generating protrusion 111), two, or four or more kinds of the turbulence-generating protrusion 110 may be provided.

Among the first turbulence-generating protrusion 111, the second turbulence-generating protrusion 112, and the third turbulence-generating protrusion 113, the third turbulence-generating protrusion 113 located on the innermost side in the tire radius direction is located at least on the inner wall surface 101 in the circumferential recessed section 100. The second turbulence-generating protrusion 112 and the first turbulence-generating protrusion 111 located on the outer side in the tire radius direction than the third turbulence-generating protrusion 113 are located on the bottom surface 103. The plurality of turbulence-generating protrusions are arranged to be biased inside in the tire radius direction based on the center in the tire radius direction of the circumferential recessed section 100.

If the turbulence-generating protrusions are thus arranged to be biased inside in the tire radius direction of the circumferential recessed section, air flowing in from the side wall surface 101 can be adhered to or separated from the tire surface between the turbulence-generating protrusions without releasing the air, flowing in from the side wall surface 101, in a tire outside direction. If the turbulence-generating protrusions are arranged to be biased inside in the tire radius direction of the circumferential recessed section, since turbulence-generating protrusions are close to a bead section, a high cooling effect can be exerted.

In the pneumatic tire 1 according to this embodiment, in the tire cross section, a distance between an inner surface on the inside in the tire width direction Tw of the carcass body section 41 and the rim-separation point 61a in contact with a normal rim is specified as a tire reference thickness T0, and a distance between an inner surface on the inside in the tire width direction Tw of the folded section 42 and the tire outer surface of the circumferential recessed section 100 is specified as a tire thickness T1. For details, the tire reference thickness T0 is a distance along a direction orthogonal to the inner surface on the inside in the tire width direction Tw of the carcass body section 41. The tire thickness T1 is a distance along a direction orthogonal to the inner surface on the inside in the tire width direction Tw of the folded section 42.

If the tire reference thickness T0 and the tire thickness T1 are specified as described above, the turbulence-generating protrusion 110 are provided in a region where the tire thickness T1 is 20% or more and 60% or less of the tire reference thickness T0. Namely, the first turbulence-generating protrusion 111, the second turbulence-generating protrusion 112, and the third turbulence-generating protrusion 113 are provided in the region where the tire thickness T1 is 20% or more and 60% or less of the tire reference thickness T0.

Specifically, as shown in FIGS. 2 and 4, the circumferential recessed section 100 includes a region 200 where the tire thickness T1 is 20% or more and 60% or less of the tire reference thickness T0. In the example of FIG. 2, a tire thickness T1a at a point 200a on the tire outer surface of the circumferential recessed section 100 is 20% or more and 60% or less of the tire reference thickness T0. A tire thickness T1b at a point 200b on the outer surface of the circumferential recessed section 100 is 20% or more and 60% or less of the tire reference thickness T0.

As shown in FIGS. 2 and 4, the turbulence-generating protrusion 110 is provided in the region 200 where the tire thickness T1 is 20% or more and 60% or less of the tire reference thickness T0. In other words, the tire thickness at a joint portion where the turbulence-generating protrusion 110 and the circumferential recessed section 100 are joined to each other can be said to be the tire thickness T1 which is 20% or more and 60% or less of the tire reference thickness T0. Alternatively, it can be said that the turbulence-generating protrusion 110 is provided between an end 200a on the inside in the tire radius direction Td in the region 200 and an end 200b on the outside in the tire radius direction Td in the region 200.

As shown in FIG. 3(a) or 3(b), the turbulence-generating protrusions 110 are each formed into a substantially solid rectangular shape. At least one of the turbulence-generating protrusions has a width direction lateral surface located outside in the tire width direction Tw, a radius direction internal surface located inside in the tire radius direction Td of the width direction lateral surface, and a radial lateral surface located outside in the tire radius direction Td of the width direction lateral surface. Hereinafter, the shape of the turbulence-generating protrusion 110 will be described. The first turbulence-generating protrusion 111, the second turbulence-generating protrusion 112, and the third turbulence-generating protrusion 113 are formed into solid rectangular shapes having substantially the same number of surfaces, and thus the first turbulence-generating protrusion 111 will be described as a representative example.

The first turbulence-generating protrusion 111 has a width direction lateral surface 111a, a radial internal surface 111b located inside in the tire radius direction Td of the width direction lateral surface 111a, a radial lateral surface 111c located outside in the tire radius direction Td of the width direction lateral surface 111a, a circumferential side surface 111d located on one side in the tire circumferential direction Tc of the width direction lateral surface 111a, and a circumferential side surface 111e located on the other side in the tire circumferential direction Tc of the width direction lateral surface 111a.

Specifically, the radial internal surface 111b extends from an end on the inside in the tire radius direction Td of the width direction lateral surface 111a to the tire outer surface of the circumferential recessed section 100. The radial lateral surface 111c extends from an end on the outside in the tire radius direction Td of the width direction lateral surface 111a to the tire outer surface of the circumferential recessed section 100. The circumferential side surface 111d extends from one end in the tire circumferential direction Tc of the width direction lateral surface 111a to the tire outer surface of the circumferential recessed section 100. The circumferential side surface 111e extends from the other end in the tire circumferential direction Tc of the width direction lateral surface 111a to the tire outer surface of the circumferential recessed section 100.

As shown in FIG. 3(c), in this embodiment, the radial internal surface 111b extends in the tire cross section in parallel to the tire width direction Tw or extends in the tire cross section outward in the tire width direction Tw to be inclined outside in the tire radius direction Td. The radial lateral surface 111c extends in the tire cross section in parallel to the tire width direction Tw or extends in the tire cross section outward in the tire width direction Tw to be inclined inside in the tire radius direction Td.

Namely, in the tire cross section, an angle θwb with respect to the tire width direction Tw of the radial internal surface 111b is in a range of 0° or more and less than 90°. Specifically, as shown in FIG. 3(c), the angle θwb with respect to a straight line WL along the tire width direction Tw of the radial internal surface 111b is in the range of 0° or more and less than 90° Further, as shown in FIG. 3(c), in the tire cross section, the angle θab formed by the width direction lateral surface 111a and the radial internal surface 111b is preferably an obtuse angle.

As described above, the radial internal surface 111b and the radial lateral surface 111c are formed in parallel with the tire width direction Tw or formed to be inclined in the tire width direction Tw. According to the pneumatic tire 1, the radial internal surface 111b and the radial lateral surface 111c are formed in parallel with the tire width direction Tw as a mold pull-out direction or formed to be inclined in the tire width direction Tw. Thus, when a mold is pulled out in tire molding, the radial internal surface 111b and the radial lateral surface 111c of the first turbulence-generating protrusion 111 can be prevented from being caught by the mold. Consequently, poor appearance and so on in the tire molding can be prevented.

It is preferable that in all the turbulence-generating protrusions, the angle with respect to the tire width direction Tw of the radial internal surface 111b and the radial lateral surface 111c is in the range of 0° or more and less than 90°.

The width w in the tire circumferential direction Tc of the first turbulence-generating protrusion 111, the width w in the tire circumferential direction Tc of the second turbulence-generating protrusion 112, and the width w in the tire circumferential direction Tc of the third turbulence-generating protrusion 113 may be the same or different from each other. It is preferable that the width w in the tire circumferential direction Tc of the first turbulence-generating protrusion 111, the width w in the tire circumferential direction Tc of the second turbulence-generating protrusion 112, and the width w in the tire circumferential direction Tc of the third turbulence-generating protrusion 113 are 2 mm or more and 10 mm or less.

This depends on the following reason. If the width w is less than 2 mm, the turbulence-generating protrusion 110 may be vibrated by an airflow, and the strength of the turbulence-generating protrusion 110 is weak. Meanwhile, if the width w of the turbulence-generating protrusion 110 is more than 10 mm, an amount of heat accumulated in the turbulence-generating protrusion 110 is too large. In this embodiment, the width w of the turbulence-generating protrusion 110 is in the range of 2 mm to 10 mm, whereby heat radiation characteristics can be improved while minimizing disadvantages due to provision of the turbulence-generating protrusion 110 in the tire side section 20. If a side wall of the turbulence-generating protrusion 110 (the first turbulence-generating protrusion 111 or the second turbulence-generating protrusion 112) inclines and the width w in the tire circumferential direction Tc changes, the width w in the tire circumferential direction Tc is an average value of a maximum width and a minimum width. The width w of the turbulence-generating protrusion 110 is length in the tire circumferential direction of the turbulence-generating protrusion.

For the reason described above, a length L110 in the tire radius direction Td of the turbulence-generating protrusion 110 is preferably 20 mm.

The first turbulence-generating protrusion 111 and the third turbulence-generating protrusion 113 are formed to be spaced apart from each other in the tire radius direction Td. A distance L1 in the tire radius direction Td between the first turbulence-generating protrusion 111 and the third turbulence-generating protrusion 113 is preferably 15% to 30% of a pitch p1 or p2 in the tire circumferential direction Tc between the first turbulence-generating protrusion 111 (or the third turbulence-generating protrusion 113) and the second turbulence-generating protrusion 112. This depends on the following reasons. That is to say, if the distance L1 is less than 15% of the pitch p, an airflow entering the circumferential recessed section 100 is impeded, and many air retaining portions (regions) are formed in the circumferential recessed section 100. Meanwhile, the distance L1 is more than 30% of the pitch p, an airflow repeatedly adhered to or separated from the bottom surface 103 is hardly generated.

As shown in FIG. 3(b), the pitch p1 in the tire circumferential direction Tc is a distance from a center in the tire circumferential direction of the first turbulence-generating protrusion 111 (third turbulence-generating protrusion 113) to a center in the tire circumferential direction of the adjacent second turbulence-generating protrusion 112 along one side of the tire circumferential direction. The pitch p2 in the tire circumferential direction Tc is a distance from the center in the tire circumferential direction of the second turbulence-generating protrusion 112 to the center in the tire circumferential direction of the first turbulence-generating protrusion 111 (or the third turbulence-generating protrusion 113) along one side of the tire circumferential direction.

In this embodiment, a height h in the tire width direction Tw of the turbulence-generating protrusion 110 is 7.5 mm or more and 25 mm or less. Specifically, the height h of the first turbulence-generating protrusion 111, the height h of the second turbulence-generating protrusion 112, and the height h of the third turbulence-generating protrusion 113 are each 7.5 mm or more and 25 mm or less. This depends on the following reasons. If the height h is 7.5 mm or more and 25 mm or less, predetermined heat radiation characteristics can be exerted in a tire used in any speed range in a practical speed range of a tire for construction vehicles. In this embodiment, the height h of the turbulence-generating protrusion 110 represents a distance to a farthest point of the turbulence-generating protrusion 110 along a vertical direction from the tire outer surface of the circumferential recessed section 100 in which the turbulence-generating protrusion 110 are located.

A tire for heavy load often runs at a speed of 30 to 60 km per hour. In this case, a speed boundary layer formed on a tire surface (a boundary between a region where a circumferential airflow is fast and a region where the circumferential airflow is slow) is located at a high position on the outer side in the tire radius direction than a usual tire. In order to generate turbulence, a protrusion is required to be located at the boundary. Based on this standpoint, the height h of the first turbulence-generating protrusion 111, the height h of the second turbulence-generating protrusion 112, and the height h of the third turbulence-generating protrusion 113 are each accordingly preferably 7.5 mm to 25 mm. The speed boundary layer concentrically spreads outward in the tire radius direction and/or the tire width direction.

The height h of the first turbulence-generating protrusion 111, the height h of the second turbulence-generating protrusion 112, and the height h of the third turbulence-generating protrusion 113 are the same as each other. The height h is a maximum height of each turbulence-generating protrusion. Since the height h of the first turbulence-generating protrusion 111, the height h of the second turbulence-generating protrusion 112, and the height h of the third turbulence-generating protrusion 113 are the same as each other, an airflow separated from and adhered to the tire surface between the turbulence-generating protrusions is prevented from being impeded, thus enhancing the cooling effect.

A pitch P0 in the tire circumferential direction of the first turbulence-generating protrusion, the pitch P0 in the tire circumferential direction of the second turbulence-generating protrusion, and the pitch P0 in the tire circumferential direction of the third turbulence-generating protrusion are fixed. In FIG. 3, for ease of drawing, only the pitch P0 in the tire circumferential direction of the first turbulence-generating protrusion and the pitch P0 in the tire circumferential direction of the third turbulence-generating protrusion are shown. If a position (P0/2 in FIG. 3) half as long as the pitch P0 in the tire circumferential direction of the first turbulence-generating protrusion is defined as a reference, the second turbulence-generating protrusion is arranged to be biased in the tire circumferential direction. Accordingly, a pitch P1 between the second turbulence-generating protrusion and the first turbulence-generating protrusion located on one side in the tire circumferential direction from the second turbulence-generating protrusion is shorter than half of the pitch P0 in the tire circumferential direction of the first turbulence-generating protrusion. A pitch P2 between the second turbulence-generation protrusion and the first turbulence-generating protrusion located on the other side in the tire circumferential direction from the second turbulence-generating protrusion is longer than half of the pitch P0 in the tire circumferential direction of the first turbulence-generating protrusion.

In this embodiment, the height h of the turbulence-generating protrusion 110, a predetermined pitch p2 in the tire circumferential direction Tc of the turbulence-generating protrusion 110, and the width w of the turbulence-generating protrusion 110 are determined to satisfy the relationships of $1 \le P2/h \le 50$ and $1 \le (P2-w)/w \le 100$. This depends on the following reasons. That is to say, an upward and downward turbulence state of an airflow can be adjusted by approximately P2/h, and if P2/h is less than 1, the airflow as a downward flow is less likely to collide with a groove bottom between the turbulence-generating protrusion 110. Meanwhile, if P2/h is more than 50, the effect given by the turbulence-generating protrusion 110 is reduced.

It is preferable that all the turbulence-generating protrusion 110 are formed to satisfy the relationships of $1 \le P2/h \le 50$ and $1 \le (P2-w)/w \le 100$. Namely, it is preferable that all of the first turbulence-generating protrusions 111, the second turbulence-generating protrusions 112, and the third turbulence-generating protrusions 113 are formed to satisfy the relationships of $1 \le P2/h \le 50$ and $1 \le (P2-w)/w \le 100$.

(P2−w)/w represents a ratio of the width w of the turbulence-generating protrusion 110 to the pitch P2. If (P2−w)/w is less than 1.0, an area of the outer surface of the tire side section 20 in which heat radiation is desired to be improved (an area of the outer surface of the circumferential recessed section 100) is smaller than an area of the turbulence-generating protrusion 110 in a lateral view in which the pneumatic tire 1 is viewed from the tire side section side, and thus it is not preferable. The turbulence-generating protrusion 110 is formed from rubber, and, thus, since the effect of improving heat radiation due to an increase of a surface area cannot be expected; therefore, a minimum value of (P2−w)/w is specified to be 1.0. Meanwhile, if (P2−w)/w is more than 100, the effect of generating turbulence due to the turbulence-generating protrusion 110 is reduced, and thus it is not preferable.

(5) Action/Effect

In the pneumatic tire 1 according to this embodiment, the tire side section 20 has, on its outer surface, the circumferential recessed section 100 depressed inward in the tire width direction Tw and extending in the tire circumferential direction Tc.

In the pneumatic tire 1 according to this embodiment, if the tire reference thickness T0 is specified in the tire cross section, the turbulence-generating protrusion 110 is provided in a region where the tire thickness T1 of the inner surface of the folded section 42 and the outer surface of the circumferential recessed section 100 is 20% or more and 60% or less of the tire reference thickness T0 along the direction orthogonal to the inner surface of the folded section 42.

Here, if the turbulence-generating protrusion 110 is provided in a region where the tire thickness T1 is less than 20% of the tire reference thickness T0, during manufacturing of a tire (during vulcanization), a carcass cord constituting the carcass section 40 may sometimes project and be recessed in the tire width direction by flowing of rubber upon the formation of the turbulence-generating protrusion. Specifically, since the turbulence-generating protrusion 110 is arranged in the circumferential recessed section 100, rubber flows in forming a boundary between the circumferential recessed section 100 and the tire outer surface in a region other than the circumferential recessed section 100 or in forming the turbulence-generating protrusion 110, whereby the carcass section may be deformed at several portions. If the carcass section 40 is thus deformed, distortion concentrates on the carcass section 40 to be likely to cause tire failures such as peeling of the carcass section 40 and rubber, so that tire durability is deteriorated.

Meanwhile, if the turbulence-generating protrusion 110 is provided in a region where the tire thickness T1 is more than 60% of the tire reference thickness T0, although the cooling effect on the outer surface of the tire side section 20 is obtained, an inside of a tire cannot be cooled, so that the effect of reducing a temperature increase may not be sufficiently obtained.

According to the pneumatic tire 1 of this embodiment, since the turbulence-generating protrusion 110 is provided in the region where the tire thickness T1 is 20% or more and 60% or less of the tire reference thickness T0, reduction of a temperature increase in the tire side section 20 and improvement of the tire durability can be achieved simultaneously.

Moreover, in the pneumatic tire 1 according to this embodiment, the formation of the circumferential recessed section 100 reduces the volume of the rubber used for the tire side section 20 compared with the case where no circumferential recessed section 100 is formed. In other words, in the tire side section 20, an amount of rubber to be deformed with the rotation of the pneumatic tire 1 is reduced. Thus, heat generation due to the deformation of the rubber in the tire side section 20 can be suppressed. Furthermore, since the amount of rubber for producing the pneumatic tire 1 can be reduced, manufacturing cost for the pneumatic tire 1 can be reduced.

It is preferable that a portion of the turbulence-generating protrusion 110 is formed to project on the outer side in the tire width direction Tw by a predetermined projection height than the virtual circular arc curve Vc1. According to the pneumatic tire 1, air flowing along the outer surface of the tire side section 20 collides with the projecting portion of the turbulence-generating protrusion 110 to easily flow inward of the circumferential recessed section 100. Namely, an amount of air flowing inside the circumferential recessed section 100 is increased, thus reducing a temperature increase of rubber.

The turbulence-generating protrusion 110 is arranged in the circumferential recessed section 100 to be spaced apart outside in the tire radius direction Td from the inner end 100a in the tire radius direction Td of the circumferential recessed section 100. According to the pneumatic tire 1, an airflow easily flows inward of the circumferential recessed section 100 through between the inner end 100a in the tire radius direction Td of the circumferential recessed section 100 and the turbulence-generating protrusion 110. Namely, the amount of air flowing inside the circumferential recessed section 100 is increased, thus reducing the temperature increase of rubber.

Comparative Evaluation

Next, in order to further clarify the effects of the present invention, description is given of comparative evaluation conducted using the following pneumatic tires according to a conventional example, comparative examples and examples. Note that the present invention is not limited to these examples.

(1) Evaluation Method

Several kinds of pneumatic tires were tested to evaluate a temperature increase of each tire and tire durability. Each tire had a tire size of 59/80R63. Namely, tires for heavy load were used in all tests.

Figure 5:
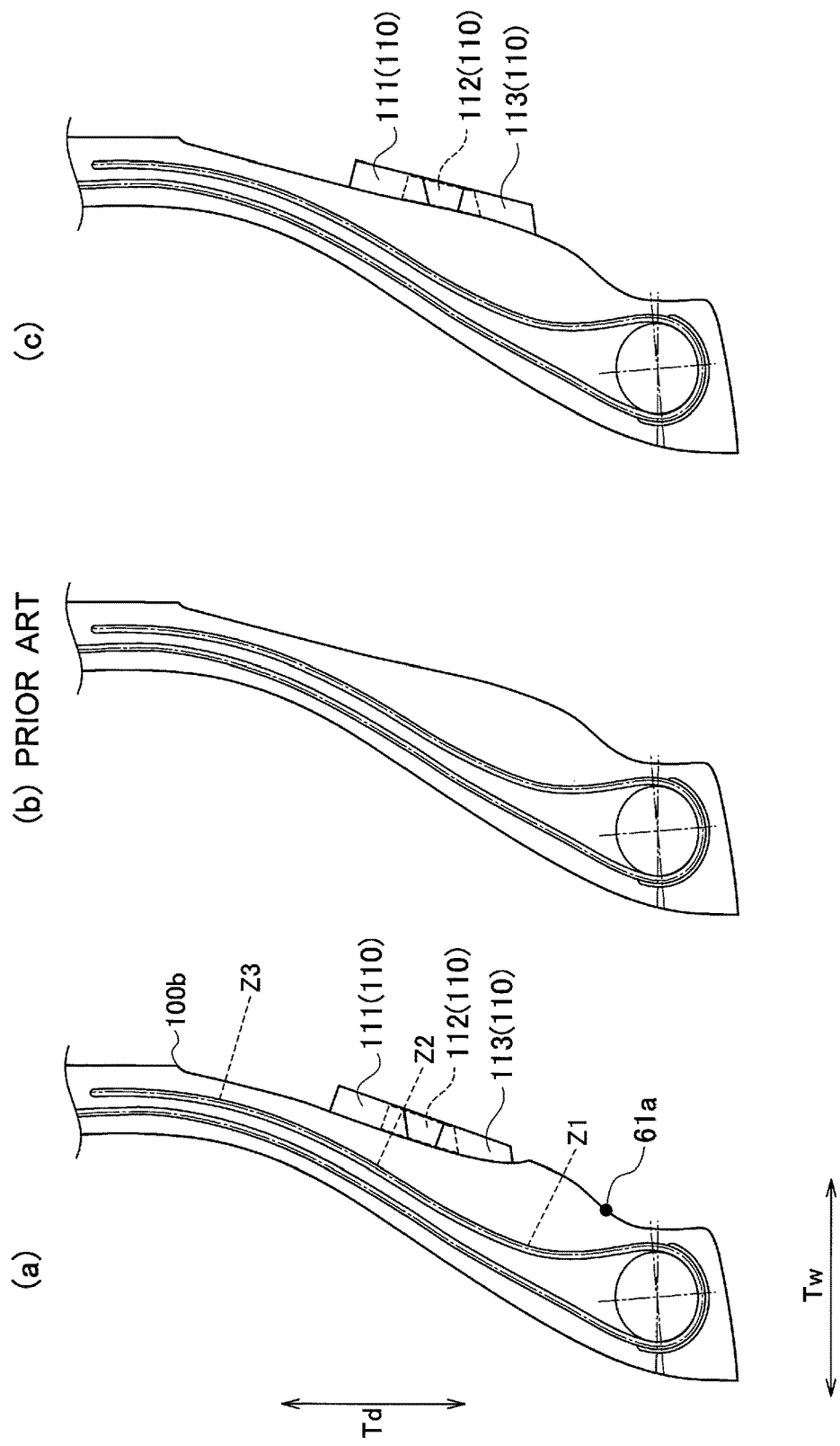
FIG. 5(a) is a partially enlarged cross-sectional view of a pneumatic tire according to an example.
FIG. 5(b) is a partially enlarged cross-sectional view of a pneumatic tire according to a conventional example.
FIG. 5(c) is a partially enlarged cross-sectional view of a pneumatic tire according to Comparative Example 1.

FIG. 5(a) shows an enlarged cross-sectional view of a pneumatic tire according to Example 1. As the pneumatic tire according to Example 1, the pneumatic tire shown in the above embodiment was used. Specifically, the pneumatic tire according to Example 1 had a circumferential recessed section in a tire side section and had a turbulence-generating protrusion in the circumferential recessed section. The detailed constitution of Example 1 is as shown in Table 1.

As a pneumatic tire according to a conventional example, a pneumatic tire having no circumferential recessed section in the tire side section was used as shown in FIG. 5(b). In the pneumatic tire according to the conventional example, an outer surface of the tire side section in a tire cross section had a shape following a virtual circular arc curve Vc1.

As a pneumatic tire according to Comparative Example 1, a pneumatic tire having no circumferential recessed section in the tire side section was used as shown in FIG. 5(c). The pneumatic tire according to Comparative Example 1 had a turbulence-generating protrusion 110 in a tire side section.

As pneumatic tires according to Comparative Examples 2 and 3, pneumatic tires each having a circumferential recessed section in a tire side section were used. The pneumatic tires according to Comparative Examples 2 and 3 each had the turbulence-generating protrusion 110 in the circumferential recessed section. A region where the turbulence-generating protrusion is provided is different between the pneumatic tires according to Comparative Examples 2 and 3 and the pneumatic tire according to Example 1. The details of the pneumatic tires according to Comparative Examples 2 and 3 and the pneumatic tire according to Example 1 are as shown in Table 1.

<Temperature Evaluation Test>

In the temperature evaluation test, in such a state that each tire was assembled on a standard rim (based on TRA), and a normal internal pressure (based on TRA) and normal load (based on TRA) were applied, the tire was rolled on a drum testing machine, and then a temperature of a bead section was measured. Specifically, after the tire was run at a speed of 15 km/h for 24 hours, a temperature of a tire side section was measured. Here, as shown in FIG. 5(a), a position Z1 away from a rim-separation point 61a by 40 mm outward in the tire radius direction Td, a position Z3 away from an end 100b on the outside in the tire radius direction of the circumferential recessed section 100 by 40 mm inward in the tire radius direction, and a position Z2 as a midpoint between the position Z1 and the position Z3 were specified. Small holes were provided at the positions Z1 to Z3, and thermocouples were inserted into the holes to measure a temperature at a position away from an outer surface of a folded section 42 by 5 mm on the outside in the tire width direction. At each of the positions Z1 to Z3, temperatures at six positions were measured along the tire circumferential direction. The measurement result at each of the positions Z1 to Z3 is an average value of the measurement results at the six positions. The measurement results shown in Table 1 represent values of differences between the tires on the basis of a temperature according to the conventional example. This value shows that the larger a value in a minus (−) direction, the greater the effect of reducing a temperature increase.

<Durability Evaluation Test>

For the durability evaluation test, after the above temperature evaluation test, the load is increased to 160% of the normal internal pressure (based on TRA), and the tires were run for 400 hours. After that, each tire was cut, and a peeling area of a carcass section and rubber was measured. In the measurement results shown in Table 1, a value of the peeling area of each tire is represented by a ratio (%) on the basis of a peeling area (100) according to the conventional example. This value shows that the smaller this value, the greater the durability.

(2) Evaluation Results

The evaluation results of each pneumatic tire will be described with reference to Table 1.

It was confirmed that the peeling area of the pneumatic tire according to Example 1 was smaller than the peeling areas of the pneumatic tires according to the conventional example and Comparative Examples. Namely, it was proved that the pneumatic tire according to Example 1 has excellent durability.

Other Embodiments

As described above, the contents of the present invention have been disclosed through the embodiments of the present invention. However, it should be understood that the present invention is not limited to the description and drawings which constitute a part of this disclosure. From this disclosure, various alternative embodiments, examples and operational technologies will become apparent to those skilled in the art.

For example, in the embodiment of the present invention, although the pneumatic tire 1 is a tire for heavy load, other tires such as a tire for passenger car may be used.

In addition, a pneumatic tire filled with air or nitrogen gas may be used, or a solid tire filled with no air, nitrogen gas, or the like may be used.

As a variation, a distance in the tire circumferential direction between the first turbulence-generating protrusion and the second turbulence-generating protrusion and a distance in the tire circumferential direction between the third turbulence-generating protrusion and the second turbulence-generating protrusion may be smaller than the width of the turbulence-generating protrusion. Since the distance in the tire circumferential direction between the first turbulence-generating protrusion and the second turbulence-generating

TABLE 1

|  |  | Conventional Example | Comparative Example 1 | Comparative Example 2 | Comparative Example 3 | Example 1 |
|---|---|---|---|---|---|---|
| Tire Configuration | Height of Turbulence-generating protrusion h (mm) | — | 20 | 20 | 20 | 20 |
|  | Length of Turbulence-generating protrusion L110 (mm) | — | 20 | 20 | 20 | 20 |
|  | Formation Range of Turbulence-generating protrusion | — | 10-80% | 10-60 | 20-80 | 20-60 |
| Temperature Evaluation Results | Temperature Difference Between Examples and Conventional Example at Z1 Portion (° C.) | — | −1.0 | −5.5 | −1.5 | −5.5 |
|  | Temperature Difference Between Examples and Conventional Example at Z2 Portion (° C.) | — | −3.0 | −4.0 | −3.5 | −4.0 |
|  | Temperature Difference Between Examples and Conventional Example at Z3 Portion (° C.) | — | −1.0 | −1.0 | −1.0 | −1.0 |
| Durability Evaluation Results | Peeling at Z1 Portion (%) | 100 | 95 | 63 | 90 | 60 |
|  | Peeling at Z2 Portion (%) | 100 | 95 | 90 | 90 | 90 |
|  | Peeling at Z3 Portion (%) | 100 | 130 | 133 | 100 | 100 |
|  | Total | 300 | 320 | 286 | 280 | 250 |

As shown in Table 1, the pneumatic tires according to example 1 is proven to have a larger effect of suppressing the increase in temperature of the tire side section 20 compared with the pneumatic tires according to the conventional example and comparative examples.

protrusion and so on are not more than a width W along the tire circumferential direction of the turbulence-generating protrusion 110, air flowing along a tire side section probably rides over the first turbulence-generating protrusion or the second turbulence-generating protrusion. Namely, it is possible to further improve the effect of radiating the heat of the tire side section due to the fact that air flowing along the tire side section rides over the first turbulence-generating protrusion or the second turbulence-generating protrusion.

Moreover, the respective features of the embodiments and modified examples described above can be combined without impairing the invention. Note that, in the respective embodiments and modified examples, detailed description of the same configurations is omitted as appropriate.

As described above, the present invention includes various embodiments and the like which are not described herein, as a matter of course. Therefore, a technological scope of the present invention is defined only by items specific to the invention according to claims pertinent based on the foregoing description.

Note that the entire contents of Japanese Patent Application No. 2013-033446 (filed on Feb. 22, 2013) are incorporated herein by reference.

INDUSTRIAL APPLICABILITY

According to the features of the present invention, there can be provided a tire capable of simultaneously suppressing of a temperature increase in a tire side section and improving of tire durability.

The invention claimed is:

1. A tire comprising:
a tread section in contact with a road surface;
a tire side section continuous to the tread section;
a bead section continuous to the tire side section; and
a carcass section extending throughout the tread section, the tire side section, and the bead section, wherein
the carcass section has a carcass body section provided ranging from the tread section to a bead core in the bead section through the tire side section and a folded section folded at the bead core,
the tire side section includes a circumferential recessed section recessed inward in a tire width direction and extending in a tire circumferential direction, and the circumferential recessed section is provided with a plurality of turbulence-generating protrusions projecting outward in the tire width direction, and
in a tire cross section along the tire width direction and a tire radius direction, when a distance between an inner surface on the inside in the tire width direction of the carcass body section and a rim-separation point in contact with a standard rim is specified as a tire reference thickness, and when a distance between an inner surface on the inside in the tire width direction of the folded section and a tire outer surface of the circumferential recessed section is specified as a tire thickness, the plurality of turbulence-generating protrusions are provided in a region where the tire thickness is 20% or more and 60% or less of the tire reference thickness,
wherein, in the tire cross section, an outer surface of the tire side section has a rim-side outer surface ranging from the rim-separation point to an inner end of the circumferential recessed section in the tire radius direction and the rim-side outer surface is provided along a predetermined circular arc curve,
wherein when a virtual circular arc curve specified by extending the predetermined circular arc curve along the rim-side outer surface to a region where the circumferential recessed section is formed, a part of the turbulence-generating protrusions protrude from the virtual circular arc curve toward an outer side in the tire width direction.

2. The tire according to claim 1, wherein in the tire cross section, an end on the outside in the tire radius direction of the folded section is provided outward in the tire radius direction from a bead end located on the innermost side in the tire radius direction and is located in a range of 40% or more and 60% or less of a tire height.

3. The tire according to claim 1, wherein the plurality of turbulence-generating protrusions include a first turbulence-generating protrusion and a second turbulence-generating protrusion disposed at a predetermined pitch in the tire circumferential direction from the first turbulence-generating protrusion, and both ends in the tire radius direction of the first turbulence-generating protrusion and both ends in the tire radius direction of the second turbulence-generating protrusion are disposed in different positions in the tire radius direction.

4. The tire according to claim 3, wherein
the plurality of turbulence-generating protrusions include a third turbulence-generating protrusions disposed with an interval on the inside in the tire radius direction of the first turbulence-generating protrusion,
an end on the outside in the tire radius direction of the second turbulence-generating protrusion is located on the outer side in the tire radius direction than an end on the inside in the tire radius direction of the first turbulence-generating protrusion, and
an end on the inside in the tire radius direction of the second turbulence-generating protrusion is located on the inner side in the tire radius direction than an end on the outside in the tire radius direction of the third turbulence-generating protrusion.

5. The tire according to claim 1, wherein
at least one of the plurality of turbulence-generating protrusions includes a width direction lateral surface located outside in the tire width direction, a radial internal surface extending from an end on the inside in the tire radius direction of the width direction lateral surface to a tire outer surface of the circumferential recessed section, and a radial lateral surface extending from an end on the outside in the tire radius direction of the width direction lateral surface to the tire outer surface of the circumferential recessed section,
in the tire cross section, the radial internal surface extends in parallel with the tire width direction or extends outward in the tire width direction to be inclined outside in the tire radius direction, and
in the tire cross section, the radial lateral surface extends in parallel with the tire width direction or extends outward in the tire width direction to be inclined inside in the tire radius direction.

6. The tire according to claim 1, wherein a height h of the turbulence-generating protrusion is in a range of 7.5 mm or more and 25 mm or less.

7. The tire according to claim 1, wherein a width w of the turbulence-generating protrusion is in a range of 2 mm or more and 10 mm or less.

8. The tire according to claim 1, wherein the height h of the turbulence-generating protrusion, a predetermined pitch p in the tire circumferential direction of the turbulence-generating protrusion, and an average width w of the turbulence-generating protrusion satisfy the relationships of $1.0 \leq p/h \leq 50.0$ and $1.0 \leq (p-w)/w \leq 100.0$.

9. The tire according to claim 1, wherein the curvature radius of a bottom surface of the circumferential recessed section is more than the curvature radius of an inner wall surface formed on the inner side in the tire radius direction of the circumferential recessed section, and is less than the curvature radius of an outer wall surface formed on the outer side in the tire radius direction of the circumferential recessed section.

10. The tire according to claim 1, wherein, when a curvature radius of the inner wall surface in the no-load state with a normal internal pressure is denoted as Ra and a curvature radius of the inner wall surface in a normal-load state with a normal internal pressure is denoted as Rb, a relationship of (Ra−Rb)/Ra≤0.5 is satisfied.

11. The tire according to claim 1, wherein a maximum depth of the circumferential recessed section with respect to the virtual circular arc curve is in a range of 15 mm or more and 35 mm or less.

12. The tire according to claim 1, wherein an inner end in the tire radius direction of the circumferential recessed section, in a normal-load state with a normal internal pressure, is located in a range of 0% to 25% of a tire height in a no-load state with a normal internal pressure toward the outer side in the tire radius direction starting from the rim separation point.

13. The tire according to claim 4, wherein a distance between the first turbulence-generating protrusion and the third turbulence-generating protrusion, in the tire radius direction, is longer than a distance between an inner end of the first turbulence-generating protrusion in the tire radius direction and the outer end of the second turbulence-generating protrusion in the tire radius direction, in the tire circumferential direction, and is longer than a distance between an inner end of the second turbulence-generating protrusion in the tire radius direction and the outer end of the third turbulence-generating protrusion in the tire radius direction, in the tire circumferential direction.

14. The tire according to claim 4, wherein a distance between an inner end of the first turbulence-generating protrusion in the tire radius direction and the outer end of the second turbulence-generating protrusion in the tire radius direction, in the tire circumferential direction, and a distance between an inner end of the second turbulence-generating protrusion in the tire radius direction and the outer end of the third turbulence-generating protrusion in the tire radius direction, in the tire circumferential direction, are equal to or more than a width of each turbulence-generating protrusion.

15. The tire according to claim 1, wherein, in the tire cross section, each turbulence-generating protrusion of the plurality of turbulence-generating protrusions comprises a radius-direction-inner surface located on the inner side in the tire radius direction, wherein an angle of the radius-direction-inner surface with respect to the tire width direction is in a range of 0° or more and less than 90°.

16. The tire according to claim 1, wherein, in the tire cross section, each turbulence-generating protrusion of the plurality of turbulence-generating protrusions comprises a width-direction-lateral surface located on the outer side in the tire width direction and a radius-direction-inner surface located on the inner side in the tire radius direction of the width direction lateral surface, wherein an angle between the width-direction-lateral surface and the radius-direction-inner surface is an obtuse angle.

17. The tire according to claim 4, wherein a distance between the first turbulence-generating protrusion and the third turbulence-generating protrusion in the tire radius direction is in a range of 15% to 30% of a pitch in the tire circumferential direction between the first turbulence-generating protrusion and the second turbulence-generating protrusion.

18. The tire according to claim 1, wherein the plurality of turbulence-generating protrusions include first turbulence-generating protrusions, and second turbulence-generating protrusions disposed at a predetermined pitch in the tire circumferential direction from the first turbulence-generating protrusions, and both ends in the tire radius direction of the first turbulence-generating protrusions and both ends in the tire radius direction of the second turbulence-generating protrusions are disposed in different positions in the tire radius direction, wherein the plurality of the first turbulence-generating protrusions are arranged with a predetermined pitch in the tire circumferential direction, wherein a pitch between the first turbulence-generating protrusions and the second turbulence-generating protrusions in the tire circumferential direction is shorter than the predetermined pitch between adjacent first turbulence-generating protrusions.

19. The tire according to claim 1, wherein the plurality of turbulence-generating protrusions include first turbulence-generating protrusions, and second turbulence-generating protrusions disposed at a predetermined pitch in the tire circumferential direction from the first turbulence-generating protrusions, and both ends in the tire radius direction of the first turbulence-generating protrusions and both ends in the tire radius direction of the second turbulence-generating protrusions are disposed in different positions in the tire radius direction, wherein the plurality of the first turbulence-generating protrusions are arranged with a predetermined pitch in the tire circumferential direction, wherein a pitch between the first turbulence-generating protrusions and the second turbulence-generating protrusions in the tire circumferential direction is shorter than half of the predetermined pitch between adjacent first turbulence-generating protrusions.

20. The tire according to claim 4, wherein a distance between an inner end of the first turbulence-generating protrusion in the tire radius direction and the outer end of the second turbulence-generating protrusion in the tire radius direction, in the tire circumferential direction, and a distance between an inner end of the second turbulence-generating protrusion in the tire radius direction and the outer end of the third turbulence-generating protrusion in the tire radius direction, in the tire circumferential direction, are shorter than a width of each turbulence-generating protrusion.

* * * * *